(12) United States Patent
Semba et al.

(10) Patent No.: US 10,643,317 B2
(45) Date of Patent: May 5, 2020

(54) BIOMETRIC IMAGE PROCESSING DEVICE, BIOMETRIC IMAGE PROCESSING METHOD AND COMPUTER-READABLE NON-TRANSITORY MEDIUM

(71) Applicant: FUJITSU LIMITED, Kawasaki-shi, Kanagawa (JP)

(72) Inventors: Satoshi Semba, Kawasaki (JP); Soichi Hama, Atsugi (JP); Satoshi Maeda, Atsugi (JP); Hajime Nada, Kawasaki (JP); Yukihiro Abiko, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 148 days.

(21) Appl. No.: 15/833,673

(22) Filed: Dec. 6, 2017

(65) Prior Publication Data

US 2018/0174284 A1  Jun. 21, 2018

(30) Foreign Application Priority Data

Dec. 20, 2016  (JP) ................. 2016-246924

(51) Int. Cl.
*G06K 9/62* (2006.01)
*G06T 5/40* (2006.01)
(Continued)

(52) U.S. Cl.
CPC ............ *G06T 5/40* (2013.01); *G06K 9/00013* (2013.01); *G06K 9/00033* (2013.01);
(Continued)

(58) Field of Classification Search
CPC combination set(s) only.
See application file for complete search history.

(56) References Cited

U.S. PATENT DOCUMENTS

| 8,270,729 | B2 | 9/2012 | Saijo et al. | |
| 2006/0176467 | A1* | 8/2006 | Rafii ..................... | G01C 3/08 356/4.07 |

(Continued)

FOREIGN PATENT DOCUMENTS

| JP | 2005-032067 | 2/2005 |
| WO | 2013/020577 A2 | 2/2013 |

OTHER PUBLICATIONS

Fisher, R. et al.,"Contrast Stretching", pp. 1-5, Jan. 1, 2003, Retrieved on May 9, 2018, URL:https://homepages.inf.ed.ac.uk/rbf/HIPR2/stretch.htm, XP55473899.
(Continued)

*Primary Examiner* — Zhiyu Lu
(74) *Attorney, Agent, or Firm* — Fujitsu Patent Center

(57) ABSTRACT

A biometric image processing device includes: a memory; and a processor coupled to the memory and the processor configured to execute a process, the process comprising: capturing a biometric image of an object by a camera; obtaining a histogram of brightness values from the biometric image; correcting the biometric image by expanding a dynamic range of a partial histogram of the histogram of which an appearance frequency is equal to or more than a threshold; and calculating a distance between the camera and the object on a basis of a high frequency component of the biometric image corrected in the correcting.

15 Claims, 19 Drawing Sheets

(51) Int. Cl.
*G06T 7/77* (2017.01)
*G06K 9/46* (2006.01)
*G06K 9/00* (2006.01)
*G06K 9/52* (2006.01)

(52) U.S. Cl.
CPC ........... *G06K 9/4647* (2013.01); *G06K 9/522* (2013.01); *G06T 7/77* (2017.01); *G06K 9/00382* (2013.01); *G06K 9/00919* (2013.01); *G06T 2207/10004* (2013.01); *G06T 2207/20048* (2013.01); *G06T 2207/30196* (2013.01)

(56) References Cited

U.S. PATENT DOCUMENTS

| | | | |
|---|---|---|---|
| 2007/0172099 A1* | 7/2007 | Park | G06K 9/00281 382/118 |
| 2008/0158377 A1* | 7/2008 | Chanas | H04N 5/232 348/222.1 |
| 2008/0226148 A1* | 9/2008 | Gu | G06T 5/007 382/128 |
| 2011/0135148 A1* | 6/2011 | Hsiao | G06K 9/00355 382/103 |
| 2012/0086794 A1 | 4/2012 | Burcham et al. | |
| 2013/0170717 A1* | 7/2013 | Yabuki | G07C 9/00158 382/115 |
| 2013/0243264 A1 | 9/2013 | Aoki | |
| 2013/0259301 A1* | 10/2013 | Chen | G07D 7/187 382/103 |
| 2015/0145963 A1* | 5/2015 | Oshima | G01B 11/00 348/47 |
| 2016/0301908 A1* | 10/2016 | Itakura | G06T 5/40 |
| 2017/0039688 A1* | 2/2017 | Hirayama | G06T 5/008 |
| 2017/0131088 A1* | 5/2017 | Masuda | G01S 17/88 |
| 2017/0325721 A1* | 11/2017 | Matsuda | A61B 5/117 |

OTHER PUBLICATIONS

Extended European Search Report dated May 17, 2018 for corresponding European Patent Application No. 17206141.8, 7 pages.
Goh Kah Ong Michael et al.,"Touch-less palm print biometrics: Novel design and implementation", Image and Vision Computing, Elsevier, Guildford, GB, vol. 26, No. 12, Dec. 1, 2008 (Dec. 1, 2008), pp. 1551-1560, XP025470870, ISSN:0262-8856, DOI: 10.1016/J.IMAVIS.2008.06.010 [retrieved on Jul. 5, 2008].
EPOA—The Communication pursuant to Article 94(3) EPC issued on Jan. 30, 2020 in a counterpart European Patent Application No. 17206141.8. * Please note that Reference D1 to D4 were previously submitted in the IDS filed on Jun. 4, 2018.

* cited by examiner

201

BIOMETRIC IMAGE PROCESSING DEVICE, BIOMETRIC IMAGE PROCESSING METHOD AND COMPUTER-READABLE NON-TRANSITORY MEDIUM

CROSS-REFERENCE TO RELATED APPLICATION

This application is based upon and claims the benefit of priority of the prior Japanese Patent Application No. 2016-246924, filed on Dec. 20, 2016, the entire contents of which are incorporated herein by reference.

FIELD

A certain aspect of embodiments described herein relates to a biometric image processing device, a biometric image processing method and a computer-readable non-transitory medium.

BACKGROUND

With respect to a biometric authentication technology, it is demanded that a distance between an object and a sensor is in an appropriate range during taking an image of the object, when a sensor having a camera captures a biometric image without contacting. Therefore, a guide is often used in order to correct a posture of the object or a height of the object from the sensor. However, in a case where a biometric authentication is performed with a mobile terminal, portability is degraded when the guide is used. And so, it is demanded that the distance between the object and the camera is detected from the biometric image and the object is induced to an appropriate height.

SUMMARY

According to an aspect of the present invention, there is provided a biometric image processing device including: a memory; and a processor coupled to the memory and the processor configured to execute a process, the process comprising: capturing a biometric image of an object by a camera; obtaining a histogram of brightness values from the biometric image; correcting the biometric image by expanding a dynamic range of a partial histogram of the histogram of which an appearance frequency is equal to or more than a threshold; and calculating a distance between the camera and the object on a basis of a high frequency component of the biometric image corrected in the correcting.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

There is a method of using frequency information of an image by taking the image of a surface of an object, as a method of measuring a height of the object from a camera. In a case where an image of an identical object is taken, the object becomes larger when a height of the object from a camera is small, and the object becomes smaller when the height is large. In the latter case, when a frequency analysis is performed, a high frequency component gets stronger. For example, when there is a stripe pattern, a frequency component corresponding to the stripe pattern is obtained. When a pitch of the stripe pattern is narrow, the frequency of the high frequency component becomes higher. In concrete, it is thought that an image of an object is converted into a frequency space in order to confirm wrinkles of a surface of the object. In this case, when the object is held at an appropriate height and the wrinkles are clear in the image, the image includes a plurality of frequency components and many high frequency components are detected. It is possible to measure the distance between the camera and the object by calculating an association between an amount of the high frequency components and the distance between the camera and the object. When a biometric image is captured with use of a camera, there is a problem of influence of an outer light such as a sun light. Maybe, it is not possible to measure the distance under a strong outer light, in the method of measuring the distance with use of the amount of the high frequency components.

A description will be given of an outline of a biometric authentication with use of a palm vein (palm vein authentication) and a distance measurement with use of a high frequency component. The palm vein authentication is a technology in which a vein is extracted from a palm, and the extracted vein is used as biometric information. In the palm vein authentication, inner information of a palm is extracted. Therefore, it is difficult to counterfeit the palm vein, compared to a fingerprint authentication or an iris authentication.

Figure 1:
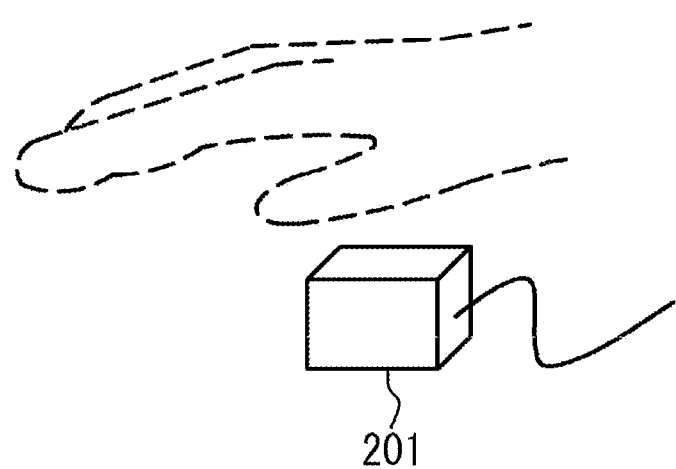
FIG. 1 illustrates a camera for capturing a palm vein.

FIG. 1 illustrates a camera 201 for capturing a palm vein. The camera 201 has a cubic shape of which one side is approximately 5 cm, and takes an image of a palm from an upper face of the palm without contacting. A palm image taken by the camera 201 is processed, and converted into biometric information for comparison. When enrolled biometric information stored in a storage is compared with a biometric information for comparison, an authentication is performed. For example, as illustrated in FIG. 1, it is preferable that a palm is horizontally held just above the camera 201. It is preferable that the camera 201 is positioned at a center of a palm, when the camera 201 is seen from above.

Figure 2:
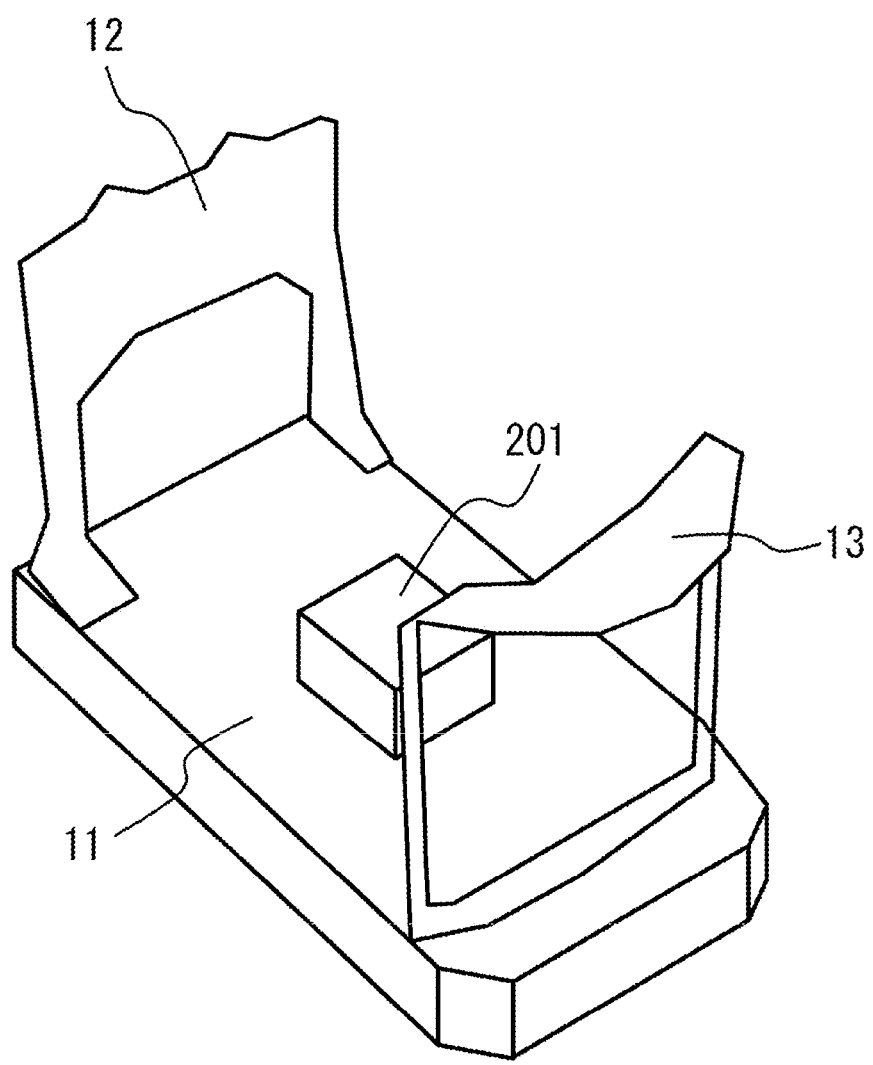
FIG. 2 illustrates a schematic perspective view of a guide.

However, a user need to get used to hold a palm at an appropriate height above the camera 201. And so, when the user is not used to a palm vein authentication, a guide for hand may be used. FIG. 2 illustrates a schematic perspective view of a guide. As illustrated in FIG. 2, the camera 201 is arranged on a base 11. An arm 12 on which a finger is placed and an arm 13 on which a wrist is placed are arranged on the base 11. When the user places his or her finger on the arm 12 and places his or her wrist on the arm 13, the palm is held at an appropriate height. It is therefore possible to perform a palm vein authentication with high accuracy.

However, it is difficult to arrange a guide. For example, it is difficult to arrange a guide for a hand in a small device such as a tablet terminal or a note-book shaped personal computer. Therefore, a method for inducing a palm to an appropriate height is demanded.

Figure 3:
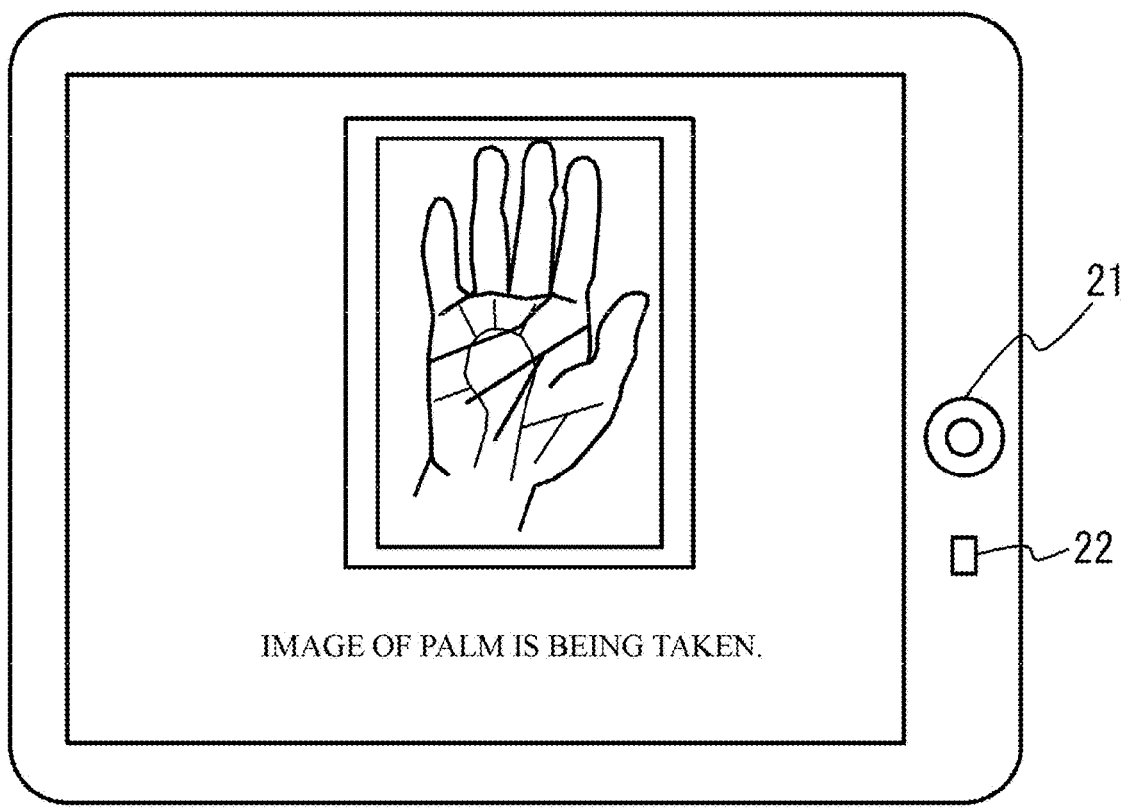
FIG. 3 illustrates a tablet terminal.

FIG. 3 illustrates a tablet terminal as an example. As illustrated in FIG. 3, a camera 21 and an infrared ray LED 22 are provided on a face on which a display such as a liquid crystal is arranged. In order to precisely take an image of a whole area of a palm, the camera 21 may achieve an appropriate focus of which a focal length is 30 mm to 70 mm with use of a wide-angle lens. The infrared ray LED 22 emits an infrared ray to a palm. The camera 21 captures a reflected light. It is possible to take an image of a palm with the two devices.

Figure 4:
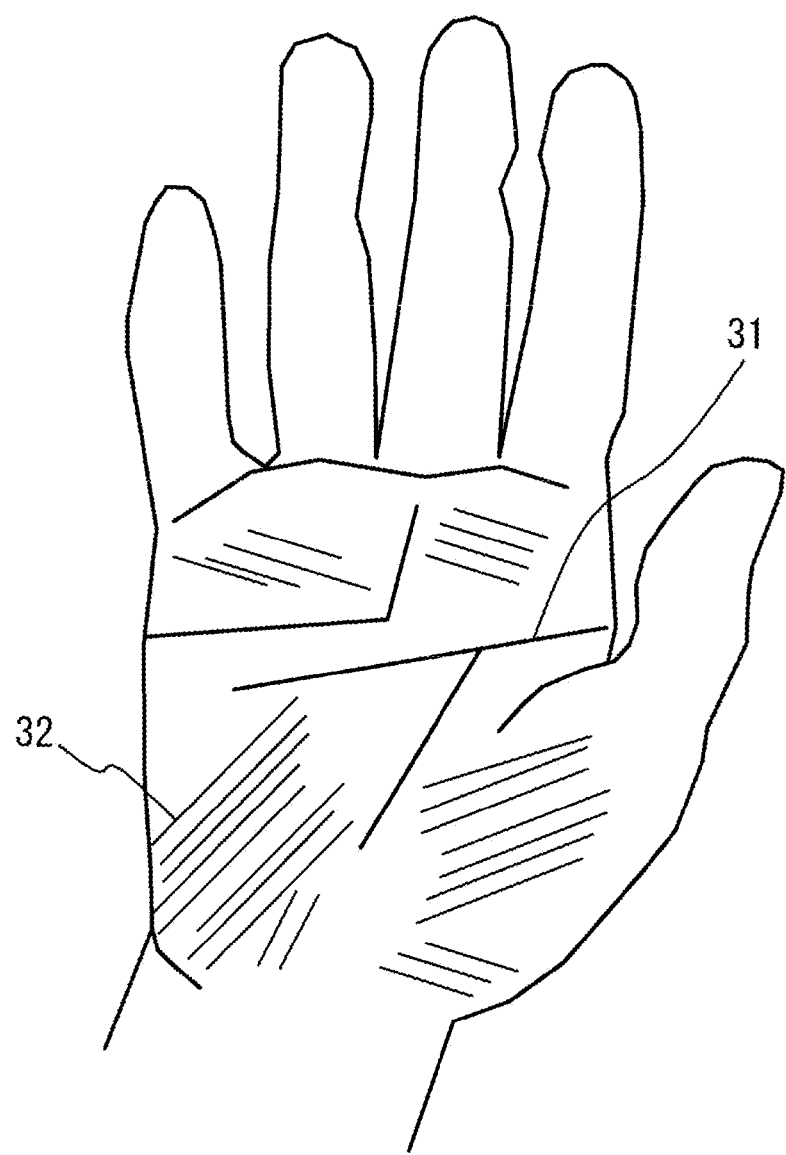
FIG. 4 illustrates a palm.

There is a method of confirming whether a wrinkle of a palm is taken, as a method of accurately measuring a height of the palm. FIG. 4 illustrates a palm. As illustrated in FIG. 4, a surface of a palm includes palmistry 31. And, the surface of the palm includes a wrinkle 32 that is finer than the palmistry 31 and is similar to a fingerprint. The wrinkle 32 is very fine. A thickness of the wrinkle 32 is, for example, 0.3 mm.

Figure 5:
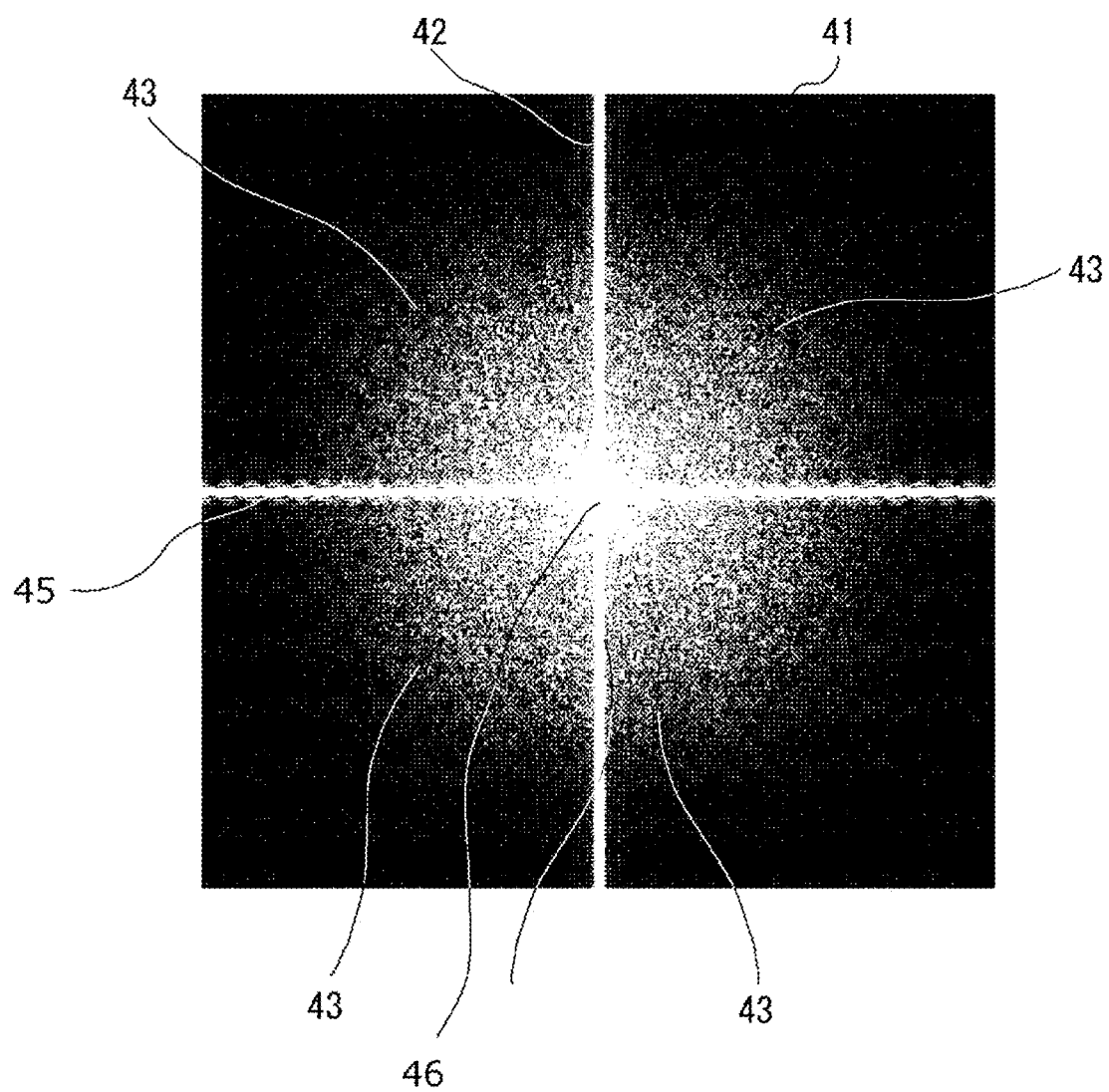
FIG. 5 illustrates space frequency distribution of a palm image.

FIG. 5 illustrates a power spectrum of a palm image, in order to understand frequency characteristic of the palm image. The power spectrum can be obtained by a DFT (Discrete Fourier Transform) or a FFT (Fast Fourier Transform). A bright spot 43 that is a low frequency component appears in a cross shape in a converted image 41. In the converted image 41, a brightness of a portion including a vertical line 42, a horizontal line 45 and a center portion 46 making a cross shape increases when there are many low frequency components in the palm image. For example, when many parts of a low repetition frequency such as an edge of a palm, palmistry of the palm, or a vein of the palm are captured, the brightness of the vertical line 42, the horizontal line 45 and the center portion 46 increases. The bright spot 43 is collected around the center of the converted image 41 in a circle shape. The bright spot 43 is a bright spot of which a brightness increases when there are many high frequency components in the palm image. The brightness of the bright spot 43 increases when parts of which a repetition frequency is high such as a wrinkle of a palm are captured. The parts indicate that a higher frequency component is included in the palm image when the brightness of a part off the center gets higher.

Figure 6:
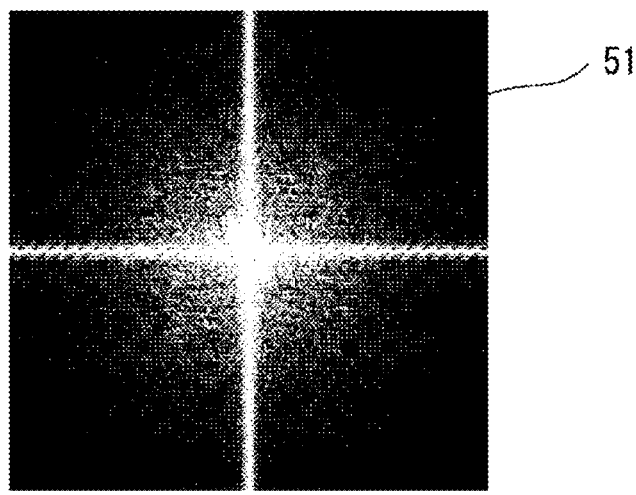
FIG. 6 illustrates converted images of a case where a distance between a palm and a camera 21 is changed.
Figure 6:
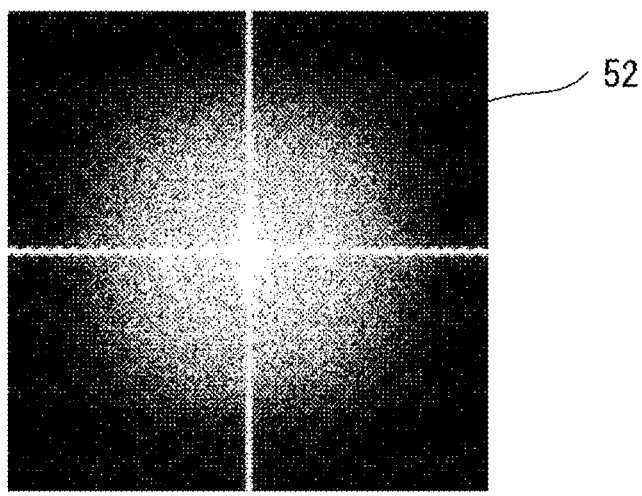
Figure 6:
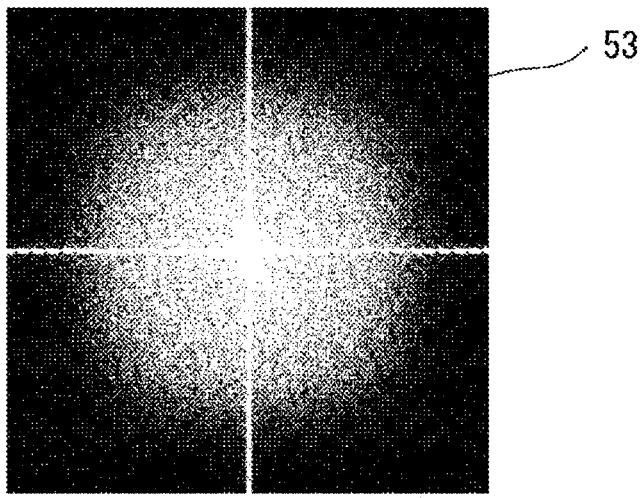

In accordance with a distance between the palm and the camera 21, distribution of the bright spot 43 is expanded or reduced. FIG. 6 illustrates converted images 51 to 53 of a case where the distance between the palm and the camera 21 is changed. The converted image 51 is a converted image of a case where the distance between the palm and the camera 21 is 20 mm. In this case, the palm is close to the camera 21. Therefore, an amount of the high frequency components is small. This is because the palm is excessively close to the camera 21, the palm is out of focus, and the wrinkle is faded.

The converted image 52 is a converted image of a case where the distance between the palm and the camera 21 is 40 mm. In this case, the amount of the high frequency components is larger than that of the converted image 51. This is because the camera 21 focuses on the palm and many bright spots of high frequency are detected. The converted image 53 is a converted image of a case where the distance between the palm and the camera 21 is 60 mm. In this case, the amount of the high frequency components is larger than the converted image 52. This is because the distance between the palm and the camera 21 gets larger, the wrinkle is captured finely, and much more bright spots of high frequency are detected.

When a palm image is converted by frequency distribution and an amount of high frequency components is calculated, it is possible to calculate the distance between the palm and the camera 21. When an operation of the palm is shown in a display with information of the distance, it is possible to induce the palm to an appropriate height.

In a method of acquiring biometric information by using a camera such as a fingerprint authentication, a vein authentication, an iris authentication or a face authentication, an outer light such as a sun light or an ambient light may influence on authentication accuracy. For example, in a room, a fluorescent light has approximately 500 lux. Therefore, the fluorescent light does not influence on acquiring of biometric information. However, a sun light has a large value of 50000 lux. Therefore, when biometric information is acquired under a sun light, biometric information shall not be acquired accurately because of the influence of the sun light. When a distance between a palm and a camera is measured by frequency distribution conversion of a palm image, the distance shall not be measured accurately under a strong outer light. This is because the histogram of brightness values of a palm image greatly changes.

Figure 7:
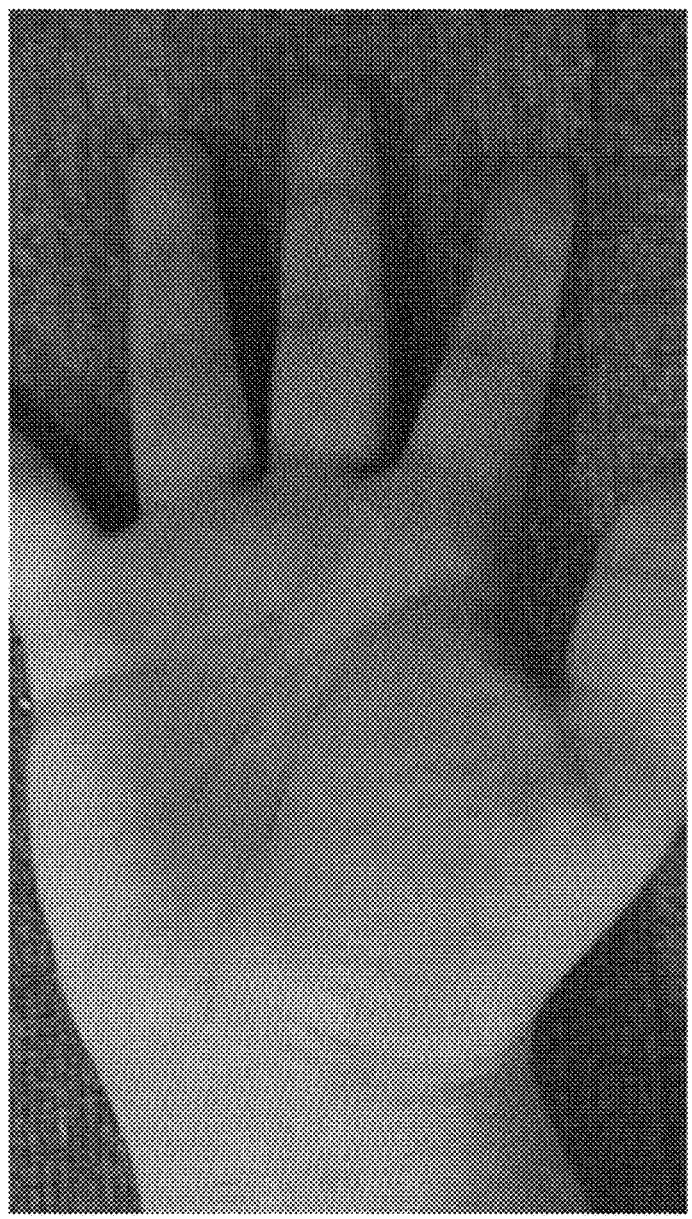
FIG. 7 illustrates a palm image acquired in a room when a distance between a palm and a camera is 40 mm.
Figure 8A:
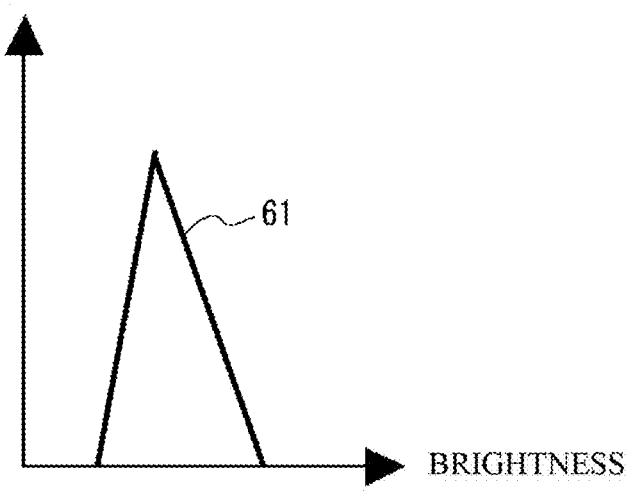
FIG. 8A illustrates a histogram of brightness values of a palm image.

FIG. 7 illustrates a palm image acquired when a distance between a palm and a camera is 40 mm. FIG. 8A illustrates a histogram 61 of brightness values of the palm image. The palm image acquired under an environment on which an outer light hardly influences is not bright and not dark. Therefore, as illustrated in FIG. 8A, an appearance frequency of a center portion becomes higher in the histogram 61.

Figure 8B:
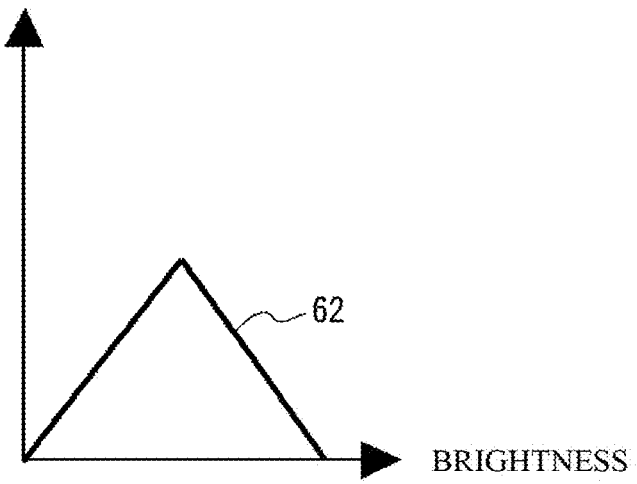
FIG. 8B illustrates a histogram of a case where a dynamic range of a palm image is expanded.

FIG. 8B illustrates a histogram 62 of a case where a dynamic range of the palm image is expanded to black (brightness: 0) and to white (brightness: 255). That is, the dynamic range of the histogram 62 is expanded more than the dynamic range of the histogram 61. When the dynamic range of the palm image is expanded, a contrast of a wrinkle increases and detection of a wrinkle gets easier.

Figure 8C:
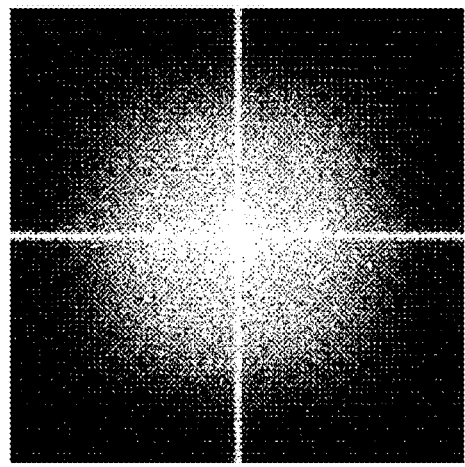
FIG. 8C illustrates a converted image of a case where a palm image subjected to a result of FIG. 8B is converted by space frequency distribution.

FIG. 8C illustrates a converted image 63 of a case where a palm image subjected to the result of FIG. 8B is converted by space frequency distribution. As illustrated in FIG. 8C, a wrinkle that is continuing of a groove is detected, and a bright spot of high frequency is detected.

Figure 9:
FIG. 9 illustrates a palm image acquired when a distance between a palm and a camera is 40 mm out of doors on a fine day.
Figure 10A:
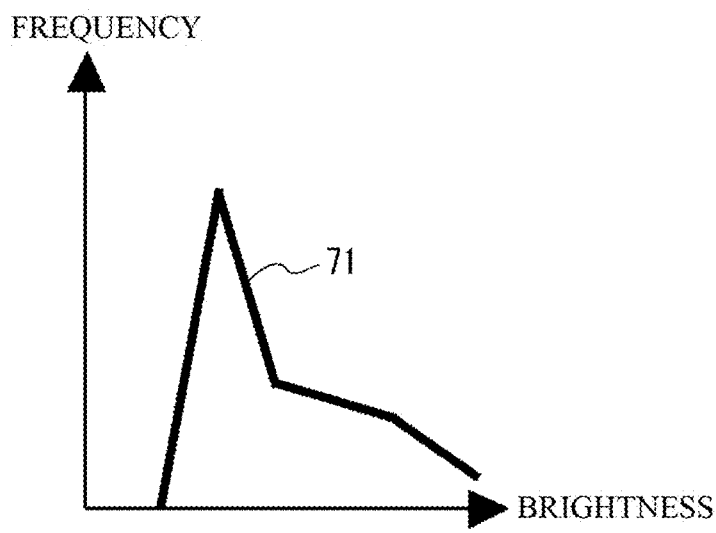
FIG. 10A illustrates a histogram of brightness values of a palm image of FIG. 9.

FIG. 9 illustrates a palm image acquired when the distance between the palm and the camera is 40 mm out of doors on a fine day. FIG. 10A illustrates a histogram 71 of brightness values of the palm image of FIG. 9. In this case, the influence of the sun light becomes larger. Therefore, as illustrated in FIG. 10A, the palm image includes a bright background. Thus, the histogram 71 extends to a maximum brightness value. Therefore, an expansible range of the dynamic range becomes smaller.

Figure 10B:
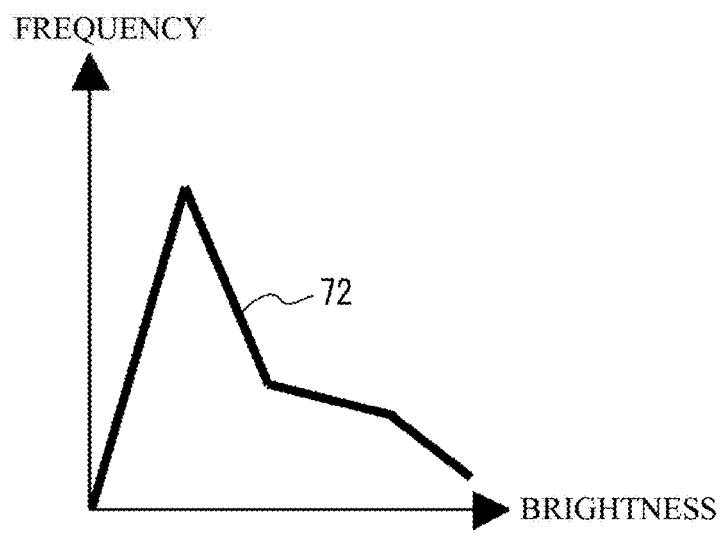
FIG. 10B illustrates a histogram of a case where a dynamic range of a palm image is expanded.
Figure 10C:
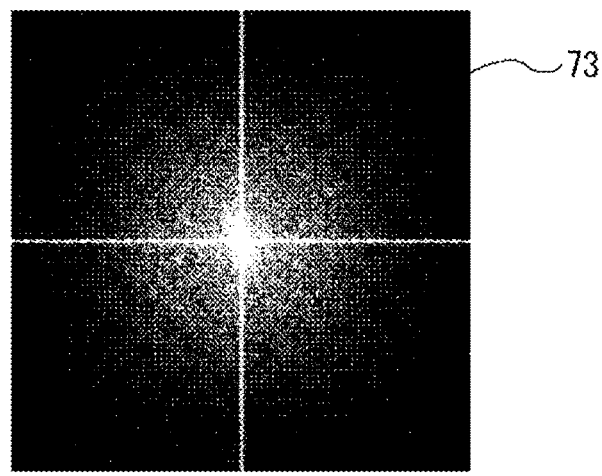
FIG. 10C illustrates a converted image acquired by space frequency distribution conversion of a palm image subjected to a result of FIG. 10B.

FIG. 10B illustrates a histogram 72 of a case where the dynamic range of the palm image is expanded to black (brightness value: 0) and white (brightness value: 255). In this case, the expansible range of the dynamic range is small. Therefore, a difference between a distribution range of the histogram 72 and a distribution range of the histogram 71 is small. FIG. 10C illustrates a converted image 73 acquired by the frequency distribution conversion of the palm image subjected to the result of FIG. 10B. It is not possible to greatly increase the contrast of the wrinkle of the palm image, because an expansible range of the dynamic range is small. Therefore, it is possible to detect only high frequency components that are similar to those of the palm image acquired when the distance between the palm and the camera is 20 mm. Accordingly, an accurate distance between the camera and the palm is not calculated under a condition with an outer light.

And so, a description will be given of a biometric image processing device, a biometric image processing method and a biometric image processing program that are capable of reducing influence of an outer light and measuring a distance between a camera and an object with high accuracy.

First Embodiment

Figure 11:
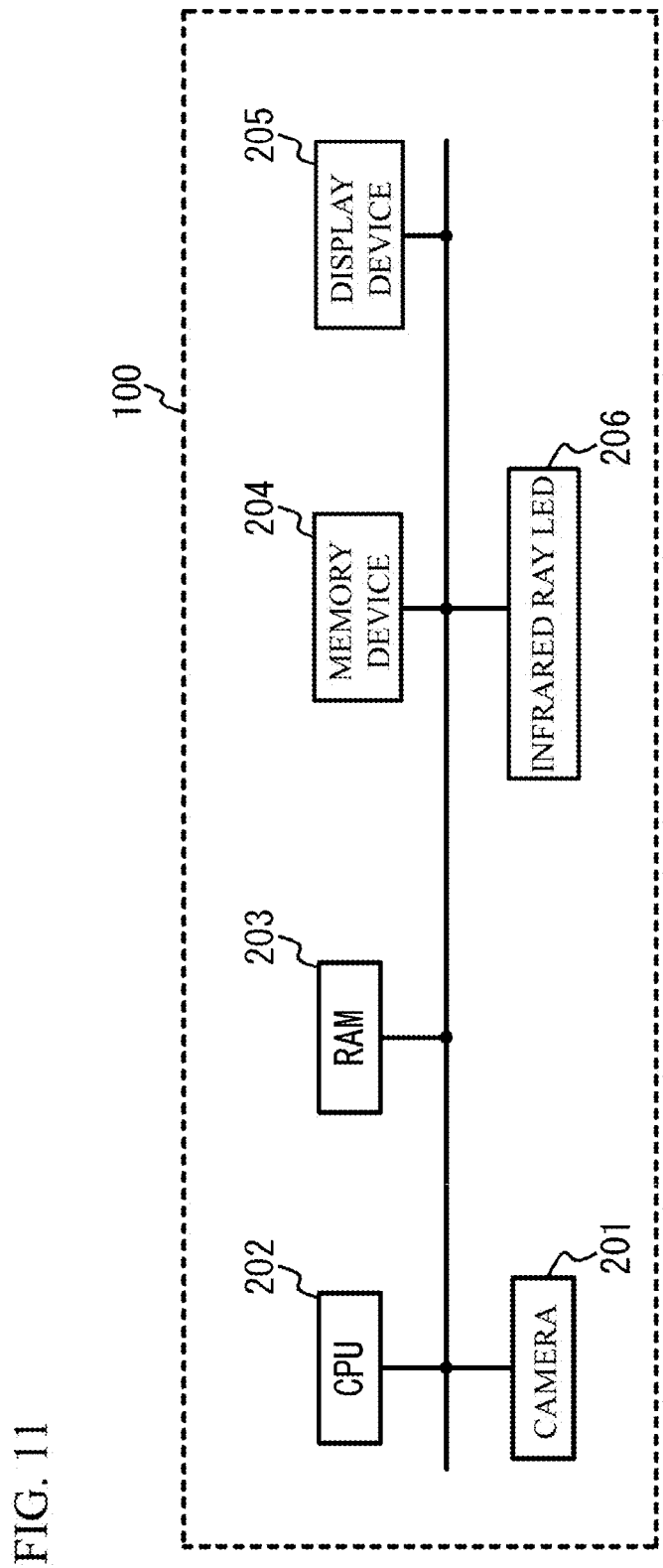
FIG. 11 illustrates a hardware structure of a biometric image processing device in accordance with a first embodiment.

FIG. 11 illustrates a hardware structure of a biometric image processing device 100 in accordance with a first embodiment. As illustrated in FIG. 11, the biometric image processing device 100 has the camera 201, a CPU (Central Processing unit) 202, a RAM (Random Access Memory) 203, a memory device 204, a display device 205, an infrared ray LED 206 and so on. These components are coupled to each other with a bus or the like.

The camera 201 is an imaging device for capturing biometric information of a user. In the embodiment, the camera 201 captures a palm image of a user without contacting. The camera 201 is, for example, a CMOS (Complementary Metal Oxide Semiconductor) camera or the like. The camera 201 may capture a blood vessel pattern such as a vein pattern, by using an infrared ray from the infrared ray LED 206.

The CPU 202 is a central processing unit. The CPU 202 includes one or more core. The RAM 203 is a volatile memory temporally storing a program executed by the CPU 202, a data processed by the CPU 202, and so on.

The memory device 204 is a nonvolatile memory device. The memory device 204 may be a SSD (Solid State Drive) such as a ROM (Read Only Memory) or a flash memory, or a hard disk driven by a hard disk drive. The memory device 204 stores a biometric image processing program in accordance with the first embodiment. The display device 205 is such as a liquid crystal display or an electroluminescence panel and shows results of processes described later.

The biometric image processing program stored in the memory device 204 is developed to the RAM 203. The CPU 202 executes the biometric image processing program developed to the RAM 203. Thus, each process is executed by the biometric image processing device 100. By the execution of the biometric image processing program, an authentication process and so on are performed. In the authentication process, biometric information for comparison acquired by the camera 201 is compared with enrolled biometric information enrolled in a database. In the embodiment, when a similarity between a vein pattern acquired in the authentication process and a vein pattern enrolled in a database is equal to or more than a threshold, it is determined that a user is the same as an enrolled user.

Figure 12:
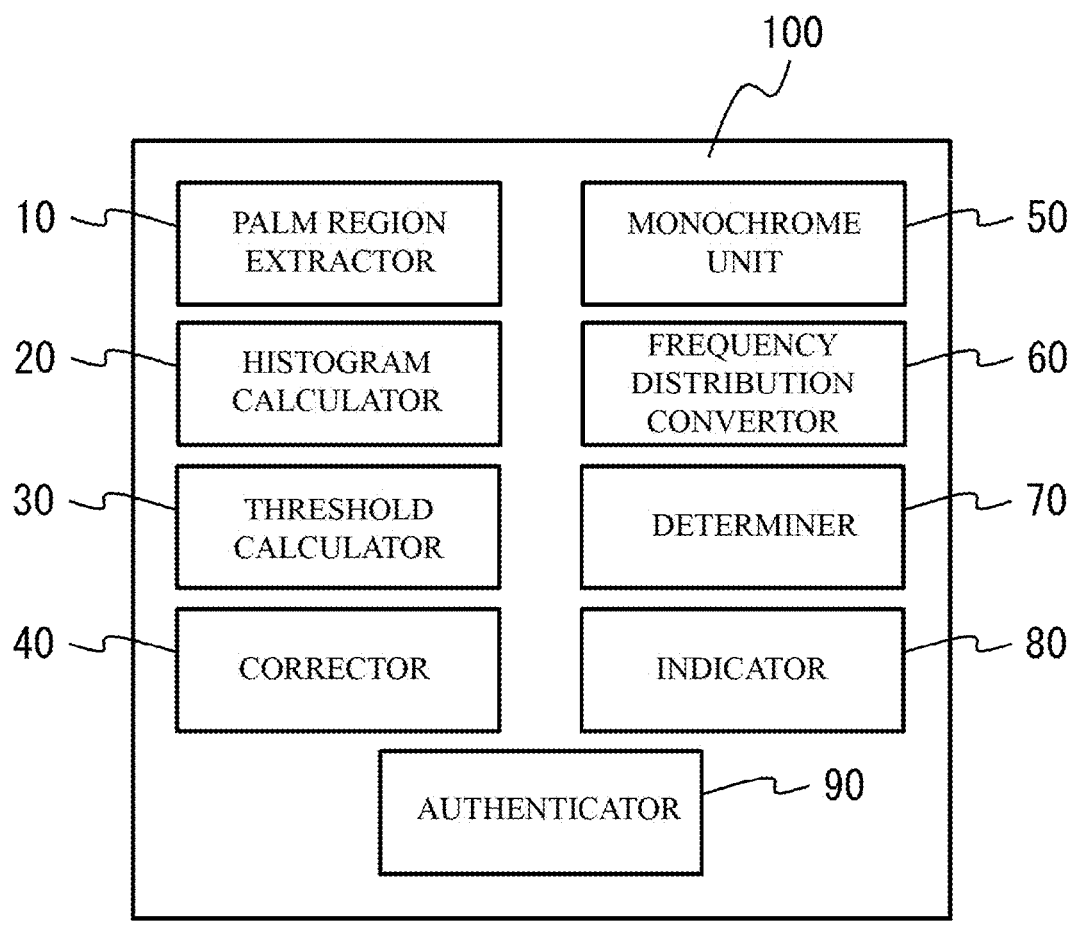
FIG. 12 illustrates a block diagram of functions realized by execution of a biometric image processing program.

FIG. 12 illustrates a block diagram of functions realized by the execution of the biometric image processing program. By the execution of the biometric image processing program, a palm region extractor 10, a histogram calculator 20, a threshold calculator 30, a corrector 40, a monochrome unit 50, a frequency distribution convertor 60, a determiner 70, an indicator 80, an authenticator 90 and so on are realized. FIG. 11 and FIG. 12 illustrate a standalone terminal. However, the structure is not limited. For example, the embodiment can be applied to a client server system. In the embodiment, a description will be given of a standalone terminal for simplicity.

Figure 13:
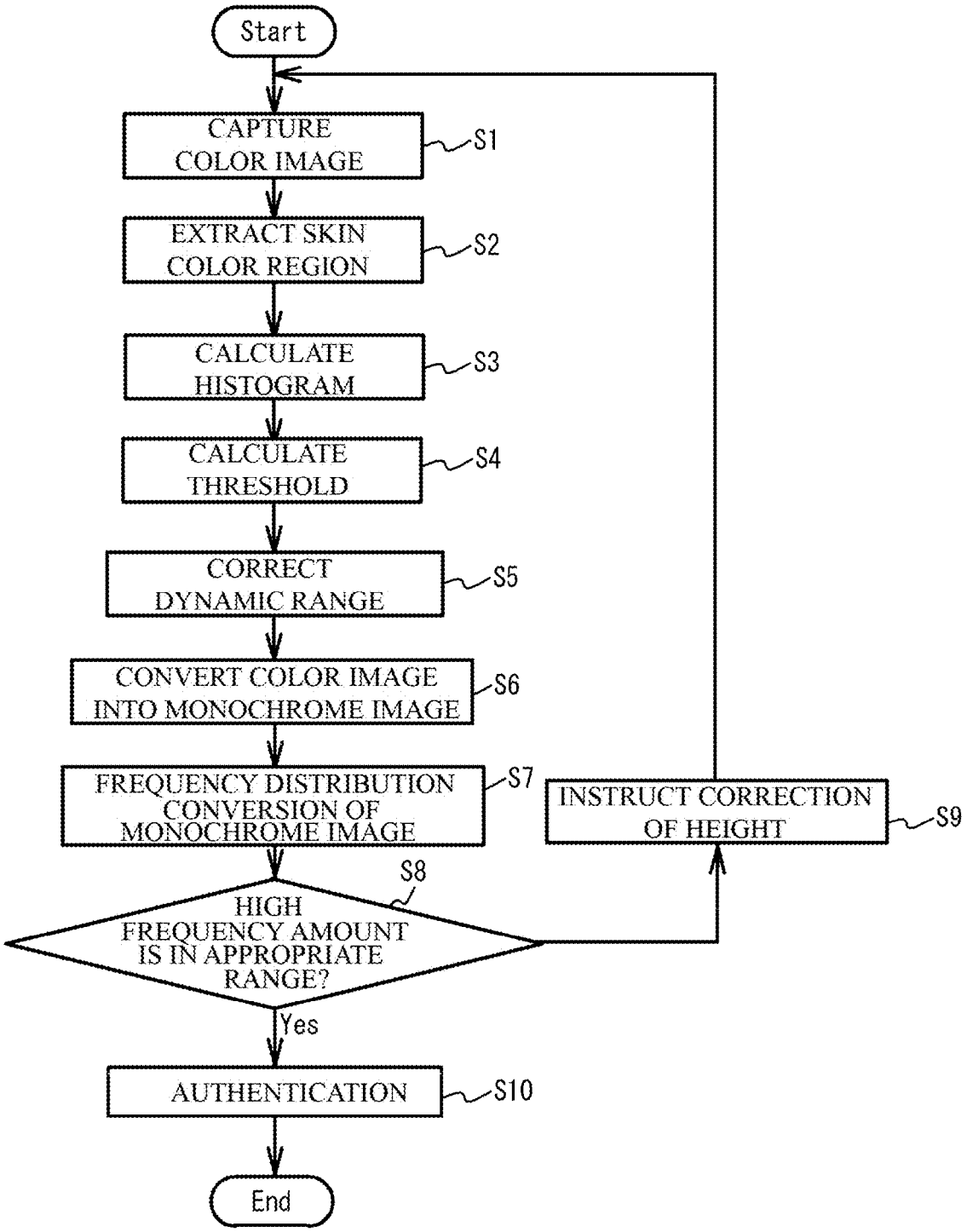
FIG. 13 illustrates a flowchart of details of an authentication process.
Figure 14A:
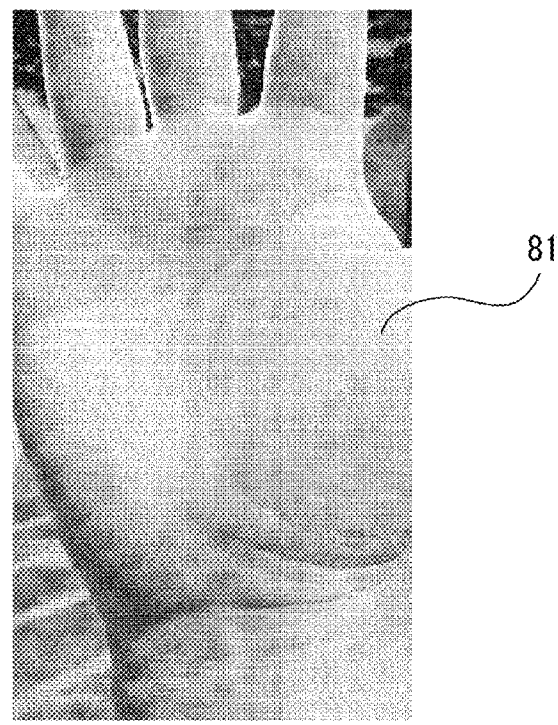
FIG. 14A illustrates a color image captured by a camera.
Figure 14B:
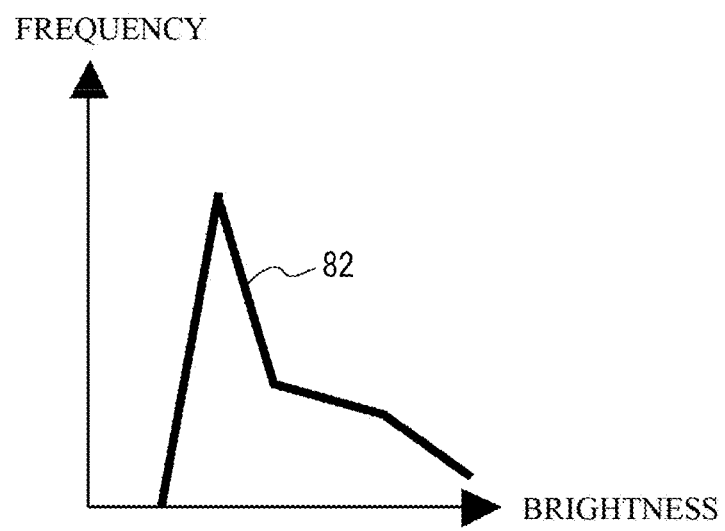
FIG. 14B illustrates a histogram of brightness values of a monochrome image of a color image.

FIG. 13 illustrates a flowchart of details of the authentication process. As illustrated in FIG. 13, the camera 201 captures a color image of a palm of a user (Step S1). FIG. 14A illustrates a color image 81 captured by the camera 201. When there is an influence of an outer light such as a sun light, background becomes brighter. FIG. 14B illustrates a histogram 82 of brightness values of a monochrome image of the color image 81. The histogram 82 extends to the maximum brightness value, because the background is bright because of the influence of the outer light. Therefore, a correctable range of the dynamic range is small.

Figure 15A:
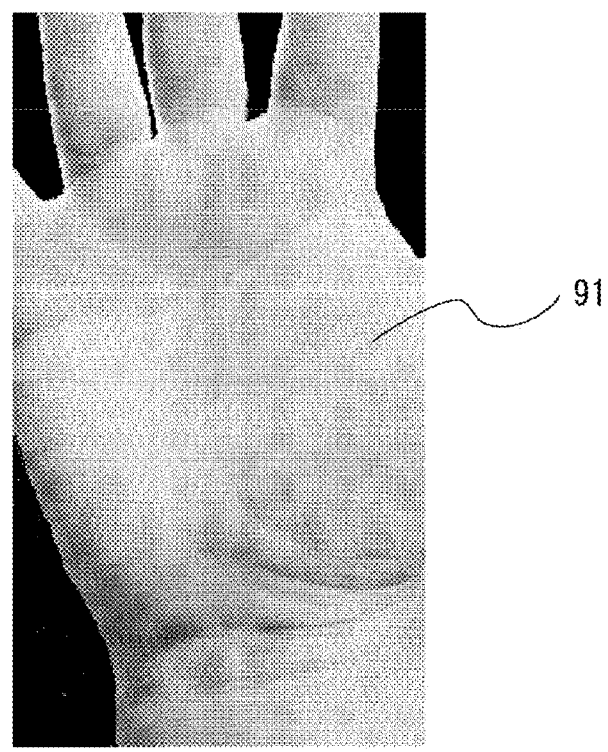
FIG. 15A illustrates an image obtained by painting background other than a palm in black.
Figure 15B:
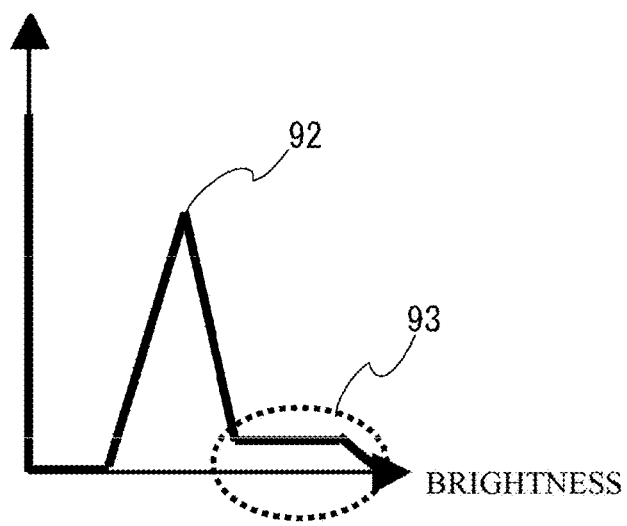
FIG. 15B illustrates a histogram of brightness values.

Next, the palm region extractor 10 extracts a skin color region corresponding to a palm, from the color image. A region other than the skin color region is background. Therefore, the palm region extractor 10 paints the region other than the skin color in black. FIG. 15A illustrates an image 91 obtained by painting the background other than the palm in black. FIG. 15B illustrates a histogram 92 of brightness values of the image 91. As illustrated in FIG. 15B, even if the background is painted in black, a high brightness portion 93 slightly remains. However, it is possible to delete almost all of an integrated amount of the background.

Figure 16A:
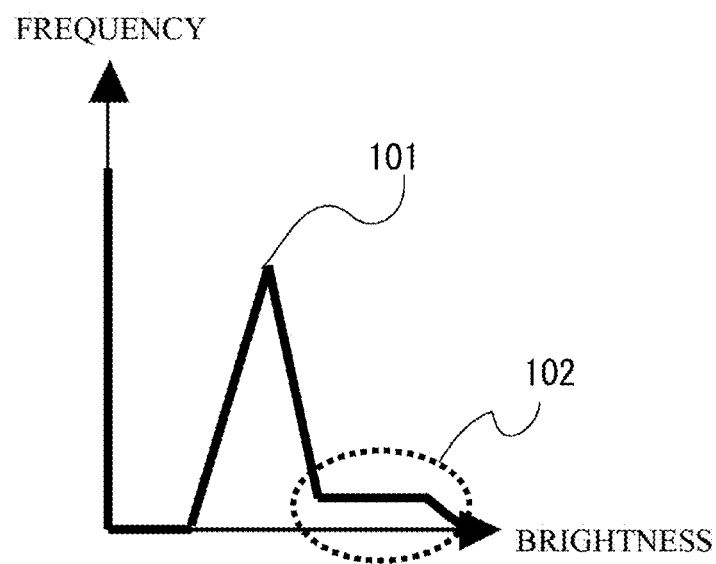
FIG. 16A illustrates a histogram.
Figure 16B:
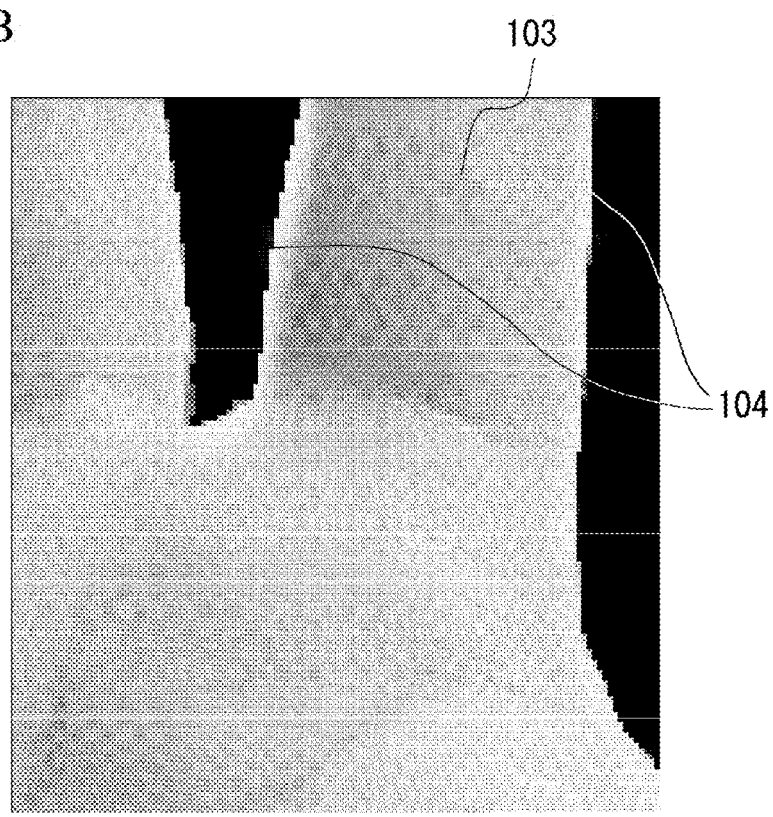
FIG. 16B illustrates a partial image that is a partially enlarged image of an image illustrated in FIG. 15A.

Next, the histogram calculator 20 calculates a histogram of brightness values of the image 91 extracted by the palm region extractor 10 (Step S3). FIG. 16A illustrates a histogram 101 calculated by the histogram calculator 20 and is the same as the histogram 92 illustrated in FIG. 15B. A high brightness portion 102 including a high brightness pixel remains in the histogram 101. FIG. 16B illustrates a partial image 103 that is a partially enlarged image of the image 91 illustrated in FIG. 15A. An edge 104 of the palm is bright, because an outer light passes through the edge 104. However, the edge 104 has a bright skin color because the outer light passes through a skin. Therefore, the edge 104 remains even if the extraction process of skin color region is performed. The edge 104 has no wrinkle. Therefore, the edge 104 is unnecessary portion for detection of wrinkles. Therefore, there is little influence on the detection of wrinkles even if the edge 104 is removed.

Figure 17A:
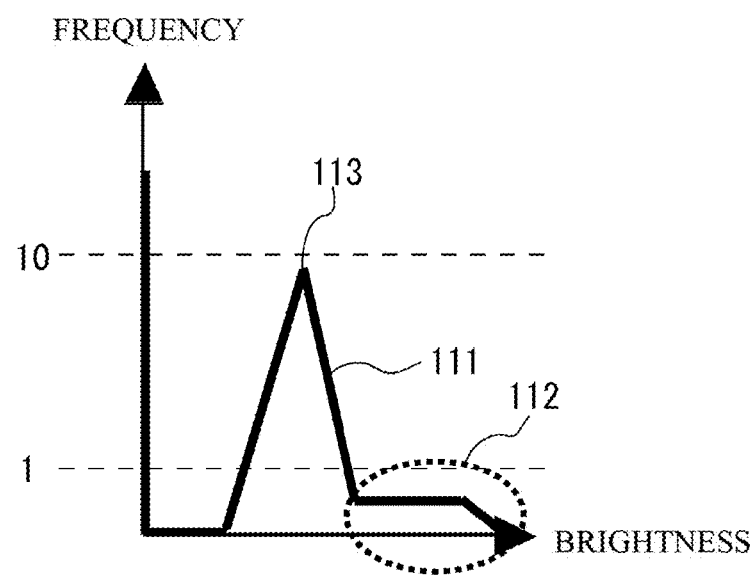
FIG. 17A illustrates a histogram.

FIG. 17A illustrates a histogram 111 that is the same as the histogram illustrated in FIG. 15B and FIG. 16A. In the histogram 111, an edge portion of a palm through which an outer light passes is integrated as a high brightness portion 112. The high brightness portion 112 is a part of a palm edge through which an outer light passes. Therefore, an appearance frequency of the high brightness portion 112 is less than 1/10 of a peak 113 of the histogram 111. And so, the threshold calculator 30 calculates 1/10 of the peak 113, as a threshold (Step S4). Alternatively, the 1/10 of the peak 113 may be rounded down. The threshold calculator 30 may calculate a value larger than the 1/10 of the peak 113, as the threshold. The threshold calculator 30 may calculate a value smaller than the 1/10 of the peak 113, as the threshold.

Figure 17B:
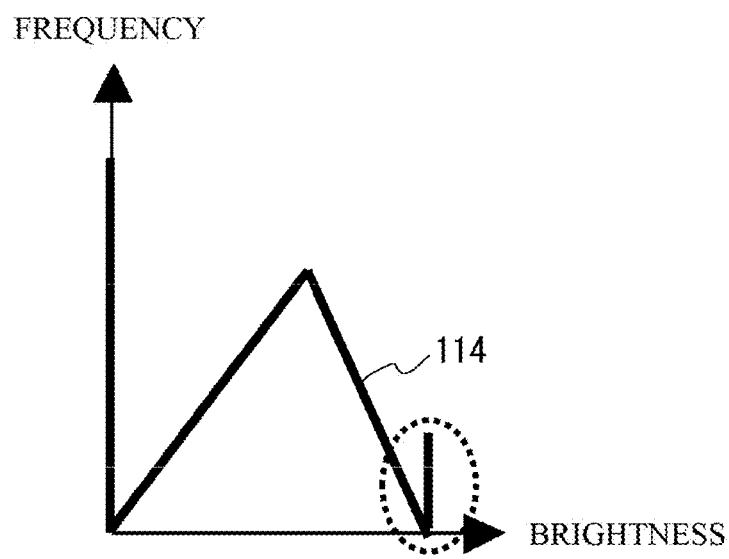
FIG. 17B illustrates a histogram of which a dynamic range is expanded.

Next, the corrector 40 corrects the dynamic range by removing a brightness portion that is less than the threshold in the histogram 111 (Step S5). For example, the corrector 40 corrects the dynamic range so that a portion of which a brightness is higher than the peak 113 and of which an appearance frequency is less than a threshold is collected to the maximum brightness value (white). And, the corrector 40 corrects the dynamic range so that a portion of which a brightness is lower than the peak 113 and of which an appearance frequency is less than the threshold is collected to the minimum brightness value (black). For example, a maximum brightness value of the portion of which a brightness value is higher than the peak 113 and of which an appearance frequency is less than the threshold is saturated to (255, 255, 255) of RGB value. And, a minimum brightness value of the portion of which a brightness value is lower than the peak 113 and of which an appearance frequency is less than the threshold is saturated to (0, 0, 0) of RGB value. Therefore, a histogram 114 of which a dynamic range is expanded is obtained, as illustrated in FIG. 17B. As illustrated in FIG. 17B, a dynamic range of a palm is expanded, and a brightness value of a portion through which an outer light passes becomes a maximum brightness value.

Figure 18A:
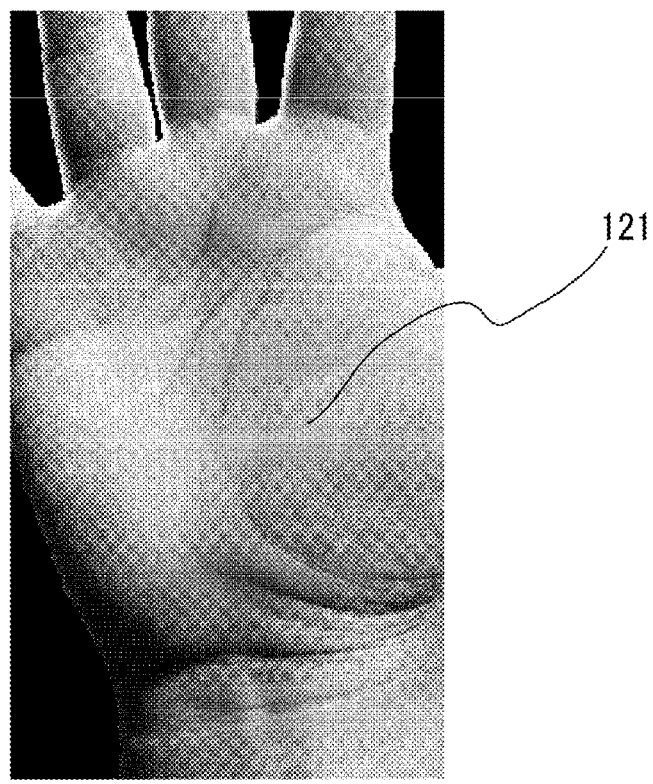
FIG. 18A illustrates a palm image of which a dynamic range is corrected.
Figure 18B:
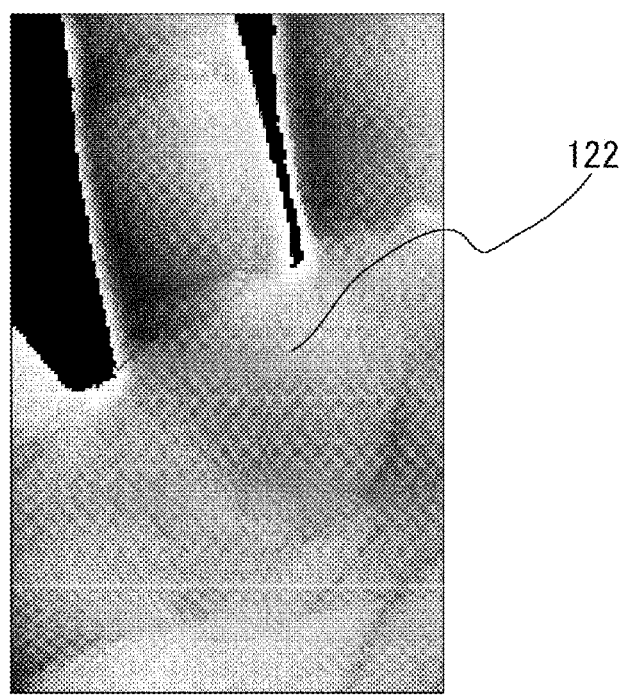
FIG. 18B illustrates a partial image that is partially enlarged view of an image.

FIG. 18A illustrates a palm image 121 after the dynamic range correction. FIG. 18B illustrates a partial image 122 that is partially enlarged view of the image 121. As illustrated in FIG. 18B, the contrast of the wrinkle of the palm is enhanced. Therefore, the wrinkle can be clearly seen.

Figure 19A:
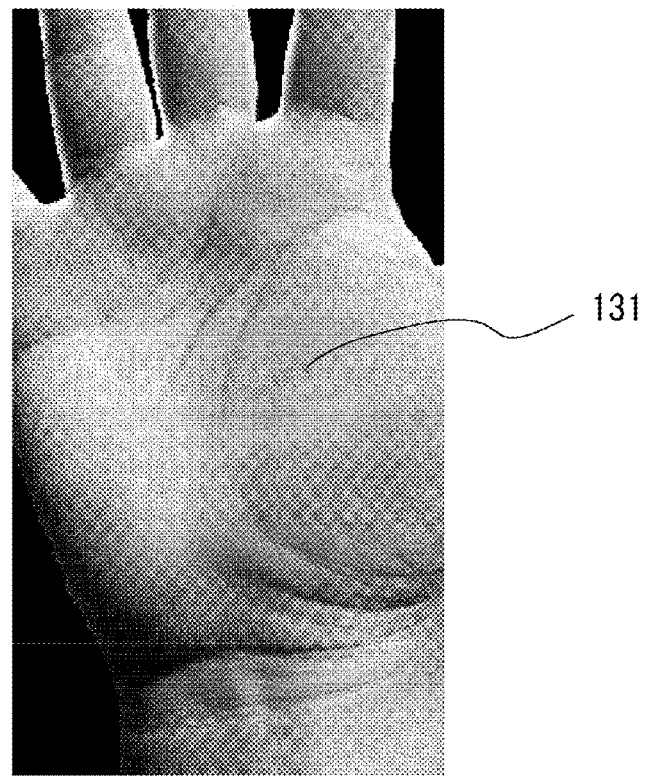
FIG. 19A illustrates a monochrome image converted by a monochrome unit.
Figure 19B:
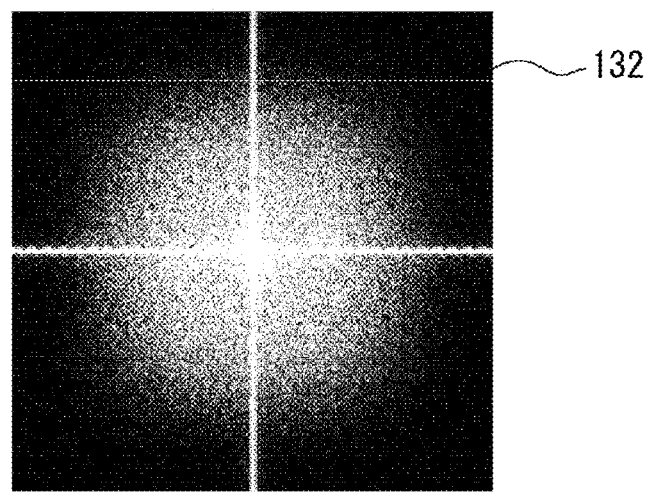
FIG. 19B illustrates a converted image after space frequency distribution conversion.

Next, the monochrome unit 50 converts the image 121 into a monochrome image (Step S6). FIG. 19A illustrates a monochrome image 131 converted by the monochrome unit 50. Next, the frequency distribution convertor 60 performs a frequency distribution conversion with respect to the monochrome image 131 (Step S7). FIG. 19B illustrates a converted image 132 after the frequency distribution conversion. As illustrated in FIG. 19B, even if the palm image includes an outer light or background, it is possible to accurately detect a palm wrinkle and detect a high frequency component.

Next, the determiner 70 determines whether an amount of the high frequency component in the converted image 132 is in an appropriate range (Step S8). When it is determined as "No" in Step S8, the indicator 80 makes the display device 205 display instruction information for correcting the height of the palm (Step S9). For example, the indicator 80 makes the display device 205 display instruction for moving the palm away from the camera 201 when the amount of the high frequency component determined by the determiner 70 is small. Alternatively, the indicator 80 makes the display device 205 display instruction for moving the palm toward the camera 201 when the amount of the high frequency component determined by the determiner 70 is large. After that, Step S1 is executed again.

When it is determined as "Yes" in Step S8, the height of the palm is in the appropriate range. Therefore, the authenticator 90 extracts biometric information such as a vein pattern as biometric information for comparison from the palm image captured by the camera 201, and performs an authentication by comparing the biometric information for comparison with enrolled biometric information (Step S10). After that, the flowchart is terminated.

In the embodiment, the brightness values less than the threshold are removed in the histogram of brightness values of the palm image. And the dynamic range of the histogram equal to or more than the threshold is expanded. It is therefore possible to suppress the influence of the outer light. Moreover, the high frequency components are detected after suppressing the influence of the outer light. It is therefore possible to detect the high frequency components with high accuracy. Accordingly, it is possible to reduce the influence of the outer light and measure the distance between the camera 201 and the object with high accuracy. When the region other than skin color is treated as background and is removed, a calculation accuracy of a histogram by the histogram calculator 20 is improved.

In the above-mentioned embodiment, an image is converted into a monochrome image after expanding a dynamic range. However, the structure is not limited. For example, a histogram may be calculated after converting a color image into a monochrome image, and a dynamic range of the histogram may be expanded.

In the above-mentioned embodiment, in a histogram of brightness values, a dynamic range of a partial histogram of which an appearance frequency is equal to or more than a threshold is expanded to the minimum brightness value (for example, (0, 0, 0) of RGB value) and to the maximum brightness value (for example, (255, 255, 255) of RGB value). However, the structure is not limited. For example, in the histogram of brightness values, a partial histogram of which an appearance frequency is equal to or more than a threshold is expanded. For example, the dynamic range of a partial histogram of which an appearance frequency is equal to or more than a threshold is expanded to at least one of a high brightness side and a low brightness side. It is preferable that the dynamic range of a partial histogram of which an appearance frequency is equal to or more than a threshold is expanded more than a case where a dynamic range of a histogram including an appearance frequency less than a threshold is expanded to a minimum brightness value and to a maximum brightness value.

In the above-mentioned embodiment, a vein pattern of a palm is used as biometric information. However, the structure is not limited. For example, a palm print, a palm shape or the like may be used as biometric information. And, in the embodiment, a palm is focused as an object. However, the object is not limited to a palm. For example, a finger used for a vein authentication or a fingerprint authentication may be used as an object. A face used for a face authentication may be used as an object.

In the above-mentioned embodiments, the camera 201 act as a camera configured to capture a biometric image of an object. The histogram calculator 20 acts as an obtainer configured to obtain a histogram of brightness values from the biometric image. The corrector 40 acts as a corrector configured to correct the biometric image by expanding a dynamic range of a partial histogram of the histogram of which an appearance frequency is equal to or more than a threshold. The frequency distribution convertor 60 and the determiner 70 act as a calculator configured to calculate a distance between the camera and the object on a basis of a high frequency component of the biometric image corrected by the corrector. The palm region extractor 10 acts as an extractor configured to extract the object from the biometric image captured by the camera.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A biometric image processing device comprising:
a memory; and
a processor coupled to the memory and the processor configured to execute a process, the process comprising:
capturing a biometric image of an object by a camera;
obtaining a histogram of brightness values from the biometric image;
correcting the biometric image by expanding a dynamic range of a partial histogram of the histogram of which an appearance frequency is equal to or more than a first threshold;
determining whether an amount of a high frequency component in the biometric image corrected in the correcting is in a predetermined range; and
outputting instruction information for correcting a distance between the camera and the object when it is not determined that the amount of the high frequency component in the biometric image corrected in the correcting is in the predetermined range, wherein
the instruction information instructs to move the object away from the camera when the high frequency component is below a second threshold, or instructs to move object toward the camera when the high frequency component is above the second threshold.

2. The biometric image processing device as claimed in claim 1, wherein, in the correcting, the dynamic range is expanded so that a pixel of which an appearance frequency of a brightness value is less than the first threshold is saturated in the histogram.

3. The biometric image processing device as claimed in claim 1, wherein:
the process further comprises extracting the object from the biometric image captured by the camera; and
in the obtaining, a histogram of brightness values of the object extracted by the extracting is obtained.

4. The biometric image processing device as claimed in claim 1, wherein the first threshold is equal to or less than ¹/₁₀ of a maximum integrated amount of the histogram.

5. The biometric image processing device as claimed in claim 1, wherein, in the calculating, the high frequency component is calculated by a Fourier transform.

6. A biometric image processing method comprising:
capturing a biometric image of an object by a camera;
obtaining a histogram of brightness values from the biometric image;
correcting the biometric image by expanding a dynamic range of a partial histogram of the histogram of which an appearance frequency is equal to or more than a first threshold;
determining whether an amount of a high frequency component in the biometric image corrected in the correcting is in a predetermined range; and
outputting instruction information for correcting a distance between the camera and the object when it is not determined that the amount of the high frequency component in the biometric image corrected in the correcting is in the predetermined range, wherein
the instruction information instructs to move the object away from the camera when the high frequency component is below a second threshold, or instructs to move object toward the camera when the high frequency component is above the second threshold.

7. The biometric image processing method as claimed in claim 6, wherein, in the correcting, the dynamic range is expanded so that a pixel of which an appearance frequency of a brightness value is less than the first threshold is saturated in the histogram.

8. The biometric image processing method as claimed in claim 6, further comprising extracting the object from the biometric image captured by the camera,
wherein, in the obtaining, a histogram of brightness values of the object extracted by the extracting is obtained.

9. The biometric image processing method as claimed in claim 6, wherein the first threshold is equal to or less than ¹/₁₀ of a maximum integrated amount of the histogram.

10. The biometric image processing method as claimed in claim 6, wherein, in the calculating, the high frequency component is calculated by a Fourier transform.

11. A computer-readable, non-transitory medium storing a program that causes a computer to execute a process, the process comprising:
capturing a biometric image of an object by a camera;
obtaining a histogram of brightness values from the biometric image;
correcting the biometric image by expanding a dynamic range of a partial histogram of the histogram of which an appearance frequency is equal to or more than a first threshold;
determining whether an amount of a high frequency component in the biometric image corrected in the correcting is in a predetermined range; and
outputting instruction information for correcting a distance between the camera and the object when it is not determined that the amount of the high frequency component in the biometric image corrected in the correcting is in the predetermined range, wherein
the instruction information instructs to move the object away from the camera when the high frequency component is below a second threshold, or instructs to move object toward the camera when the high frequency component is above the second threshold.

12. The medium as claimed in claim 11, wherein, in the correcting, the dynamic range is expanded so that a pixel of which an appearance frequency of a brightness value is less than the first threshold is saturated in the histogram.

13. The medium as claimed in claim 11, wherein:
the process further comprises extracting the object from the biometric image captured by the camera; and
in the obtaining, a histogram of brightness values of the object extracted by the extracting is obtained.

14. The medium as claimed in claim 11, wherein the first threshold is equal to or less than $\frac{1}{10}$ of a maximum integrated amount of the histogram.

15. The medium as claimed in claim 11, wherein, in the calculating, the high frequency component is calculated by a Fourier transform.

* * * * *